US006948724B2

(12) United States Patent
Davis

(10) Patent No.: US 6,948,724 B2
(45) Date of Patent: Sep. 27, 2005

(54) COMBINATION EQUIPMENT RAMP, UTILITY TRAILER, WORK SURFACE AND RECEIVER HITCH ATTACHMENT

(76) Inventor: Dennis L. Davis, 414 Circle Dr., Ft. Scott, KS (US) 66701

( * ) Notice: Subject to any disclaimer, the term of this patent is extended or adjusted under 35 U.S.C. 154(b) by 0 days.

(21) Appl. No.: 10/840,967

(22) Filed: May 7, 2004

(65) Prior Publication Data

US 2004/0251661 A1 Dec. 16, 2004

Related U.S. Application Data

(60) Provisional application No. 60/469,256, filed on May 9, 2003.

(51) Int. Cl.$^7$ ................................................ B62B 1/04
(52) U.S. Cl. .......................... 280/30; 280/643; 280/652
(58) Field of Search .......................... 280/652, 30, 32, 280/9, 656, 638, 639, 643; 108/115; 254/88, 89, 90

(56) References Cited

U.S. PATENT DOCUMENTS

| 837,372 | A | * | 12/1906 | Adams | 414/538 |
| 2,491,318 | A | * | 12/1949 | Tomlinson et al. | 414/430 |
| 3,618,894 | A | * | 11/1971 | Meyer | 254/8 R |
| 3,757,972 | A | * | 9/1973 | Martin | 414/537 |
| 4,286,800 | A | * | 9/1981 | Lomas | 280/414.1 |
| 4,650,470 | A | * | 3/1987 | Epstein | 604/149 |
| 5,340,082 | A | * | 8/1994 | Holloway | 254/88 |
| 5,607,176 | A | * | 3/1997 | Leib et al. | 280/656 |
| 5,678,804 | A | * | 10/1997 | Lintelman et al. | 254/131 |
| 5,810,544 | A | * | 9/1998 | Wellman | 414/495 |
| 5,826,857 | A | * | 10/1998 | Brack et al. | 254/8 R |
| 5,855,359 | A | * | 1/1999 | Chipperfield | 254/88 |
| 5,938,397 | A | * | 8/1999 | Schouest | 414/537 |
| 5,971,360 | A | * | 10/1999 | Sinsley | 254/8 B |
| 6,283,698 | B1 | * | 9/2001 | Lee | 414/537 |
| 6,330,997 | B2 | * | 12/2001 | McGlaun et al. | 254/94 |
| 6,345,807 | B1 | * | 2/2002 | Cacciatore | 254/3 B |
| 6,412,582 | B1 | * | 7/2002 | Leavitt | 180/182 |
| 6,474,626 | B1 | * | 11/2002 | Box | 254/131 |
| 6,659,497 | B1 | * | 12/2003 | Owens | 280/656 |
| 6,755,479 | B1 | * | 6/2004 | Meeks | 298/17 SG |

* cited by examiner

Primary Examiner—J. Allen Shriver
(74) Attorney, Agent, or Firm—Mark E. Brown

(57) ABSTRACT

A combination ramp and cart device includes a main frame and a pair of wheel support frames mounted thereon. In a ramp configuration the wheel support frames extend upwardly from the main frame and support respective front and back ends of ramp frames, which are removably mounted on the main frame. In a cart configuration the wheel support frames depend downwardly from the main frame and a pair of legs are mounted on the main frame to support same. In a cart configuration of the device, the main frame also mounts a trailer hitch frame. In another aspect of the invention, a hitch-mounted ramp device includes a hitch frame adapted for mounting on a vehicle and a pair of ramps adapted for mounting on the hitch frame.

16 Claims, 9 Drawing Sheets

COMBINATION EQUIPMENT RAMP, UTILITY TRAILER, WORK SURFACE AND RECEIVER HITCH ATTACHMENT

CROSS-REFERENCE TO RELATED APPLICATION

This application claims the benefit of U.S. provisional application No. 60/469,256, filed May 9, 2003, which is incorporated herein by reference.

BACKGROUND OF THE INVENTION

The present invention relates generally to utility trailers and, in particular, to multi-use lawn cart which may be configured as necessary as a utility trailer, equipment service ramp, work surface and lawn cart.

Various equipment for use in the yard or with a lawn tractor are known in the art. Lawn carts have been used to aid in manually transporting lawn debris and lawn tools such as rakes, shovels and hoses. Typically, a lawn cart includes an open bin or bed with three sides mounted to a frame supported by two rear wheels and front legs with a handle extending forward. The user lifts the front end of the cart off of the front support legs, pivoting the cart onto the rear wheels to push or pull the cart about the yard.

Another useful yard tool is a trailer that may be hitched to a lawn tractor and pulled by the tractor about the yard. The lawn tractor minimizes the work and strain of moving the trailer loaded with tools, hoses, or lawn debris such as grass clippings or leaves.

Maintenance of the lawn tractor, particularly the underside including the blade and mowing deck is often difficult. Prior art jacks have been proposed to lift the front end of the lawn tractor off the ground to provide access to the underside. These jacks often do not provide adequate clearance under the lawn tractor and may be unstable.

Temporary outdoor work tables may be constructed using a pair of saw horses with a plywood top. If the top is not affixed to the saw horses, it may shift or fall off or may be blown off by the wind.

All of this equipment requires space to store when not in use, may be costly to buy, and is essentially used for a specialized purpose. There is a need for a multipurpose, multi-use tool that combines the separate functions of these pieces of equipment.

BRIEF DESCRIPTION OF THE INVENTION

In the practice of one aspect of the present invention, a multi-use lawn cart includes a lawn cart for hauling lawn tools, hoses and debris for example, a removable lawn tractor hitch attached to the multi-use lawn cart for use as a utility trailer, a stable work surface, and a utility ramp/equipment stand with removable ramps to provide easy and stable access to the underside of a lawn vehicle. A utility ramp/equipment stand may also be configured for use with a trailer hitch of a vehicle.

BRIEF DESCRIPTION OF THE DRAWINGS

The drawings constitute a part of this invention and include exemplary embodiments of the present invention and illustrate various objects and features thereof.

DETAILED DESCRIPTION OF THE INVENTION

I. Introduction

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. Equipment Ramp

Figure 1:
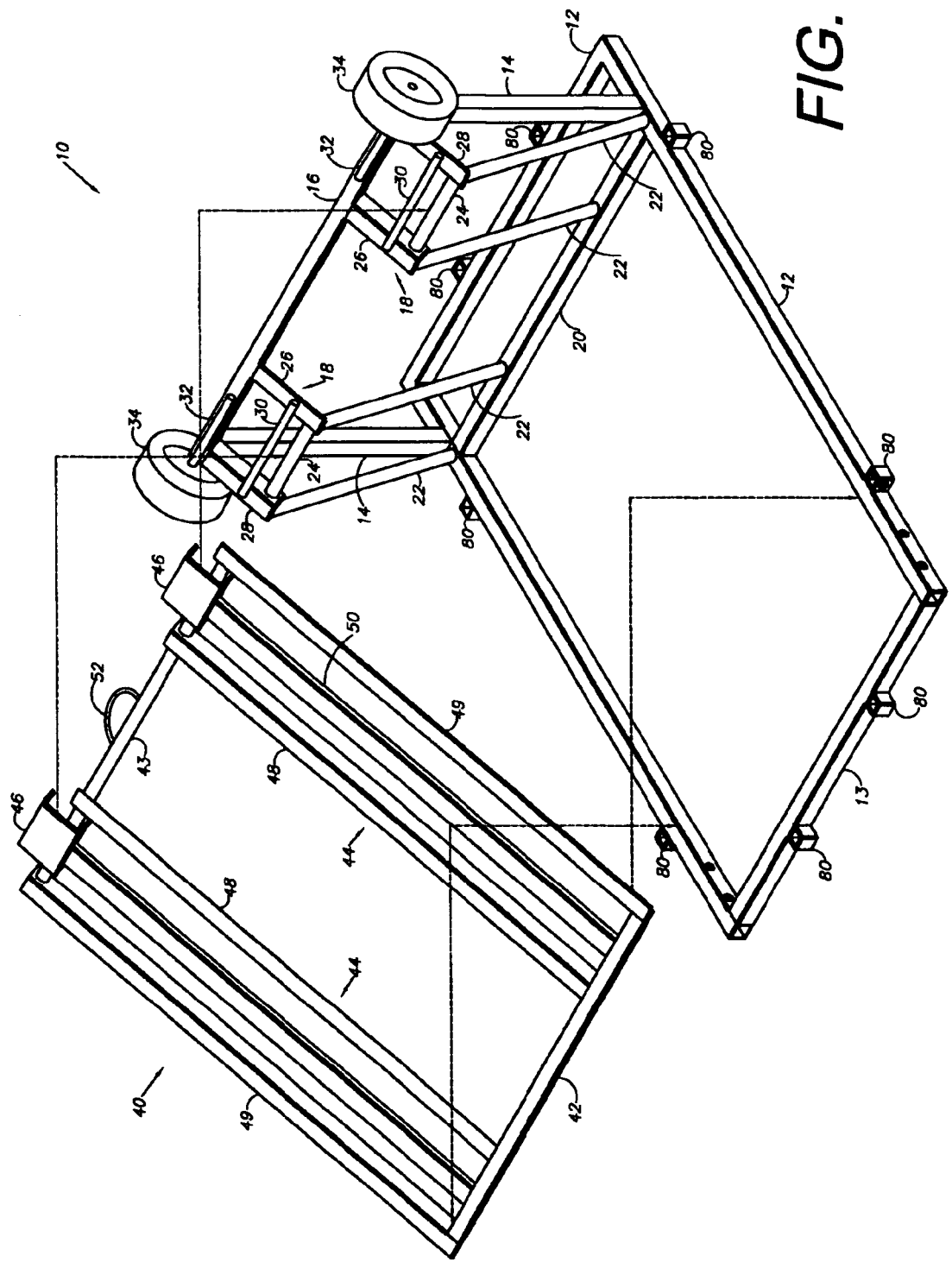
FIG. 1 is an upper perspective, exploded view of the multi-use lawn cart with removable lawn equipment ramps and frame configured for use as a stand-alone equipment servicing ramp.
Figure 2:
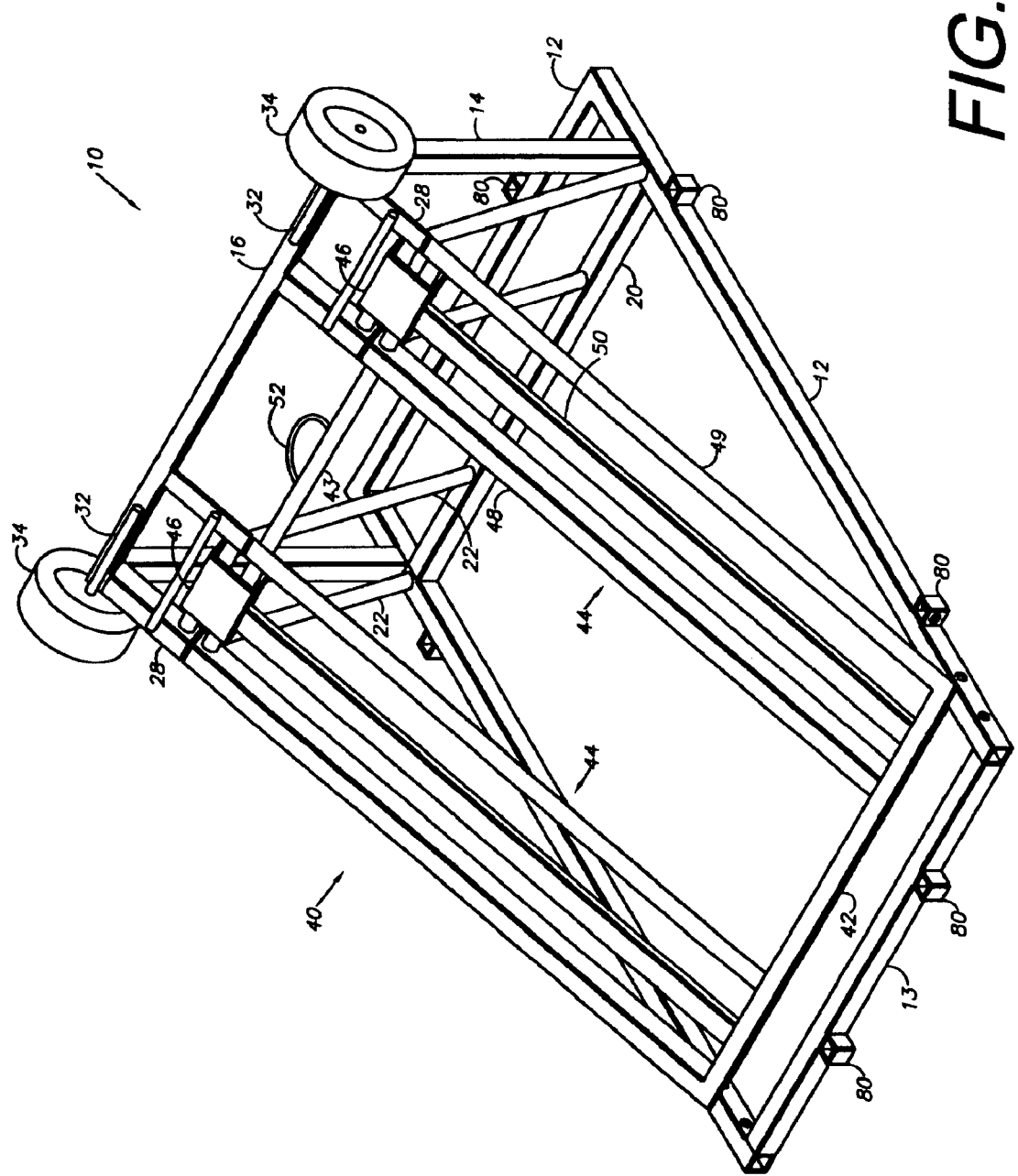
FIG. 2 is an upper perspective view of the multi-use lawn cart of FIG. 1 with the ramps and frame engaging the multi-use lawn cart frame.

Referring to FIGS. 1 and 2, an embodiment of the present invention configured as an equipment ramp is generally indicated by reference numeral 10. Multi-use lawn cart 10 includes a generally rectangularly-shaped frame 12, a pair of legs 14 connected together with a cross member 16 and a pair of wheel support frames 18 which are secured to the frame 12 and frame cross member 20 by ramp support members 22. A pair of ramp support bars 24 extend between the inner 26 and outer 28 rails of wheel support frames 18. A pair of stop bars 30 are secured to the pair of inner 26 and outer 28 rails of wheel support frames 18. Axles 32 extending from wheels 34 are secured to the surface of cross member 16.

A removable ramp frame 40 is designed to releasably engage the ramp support bars 24. Ramp frame 40 is a generally rectangular frame including a rear frame member 42, a front frame member 43, a pair of spaced-apart ramps 44 and a pair of brackets 46 which are sized to engage the ramp support bars 24. Ramps 44 include inner 48 and outer rails 49 which extend between the front 43 and rear 42 frame members, and a center rail member 50 which is generally centered between rails 48 and 49 and extends between rear frame member 42 and bracket 46. Rails 48 and 49 may be constructed of one and one-half inch angle iron. The width of ramp frame 40 is sized to fit between the side frame member of frame 12 with the outwardly facing flanges of rails 49 fitting over the side frame members of frame 12. When the brackets 46 of ramp frame 40 engage ramp support bars 24, the outside rails 49 of ramp frame 40 engage the upper and inside surfaces of the side members of frame 12. Ramp frame 40 may also include a handle 52 secured to the front frame member 43 which may be grasped by a user to lift the ramp frame 40.

Figure 3:
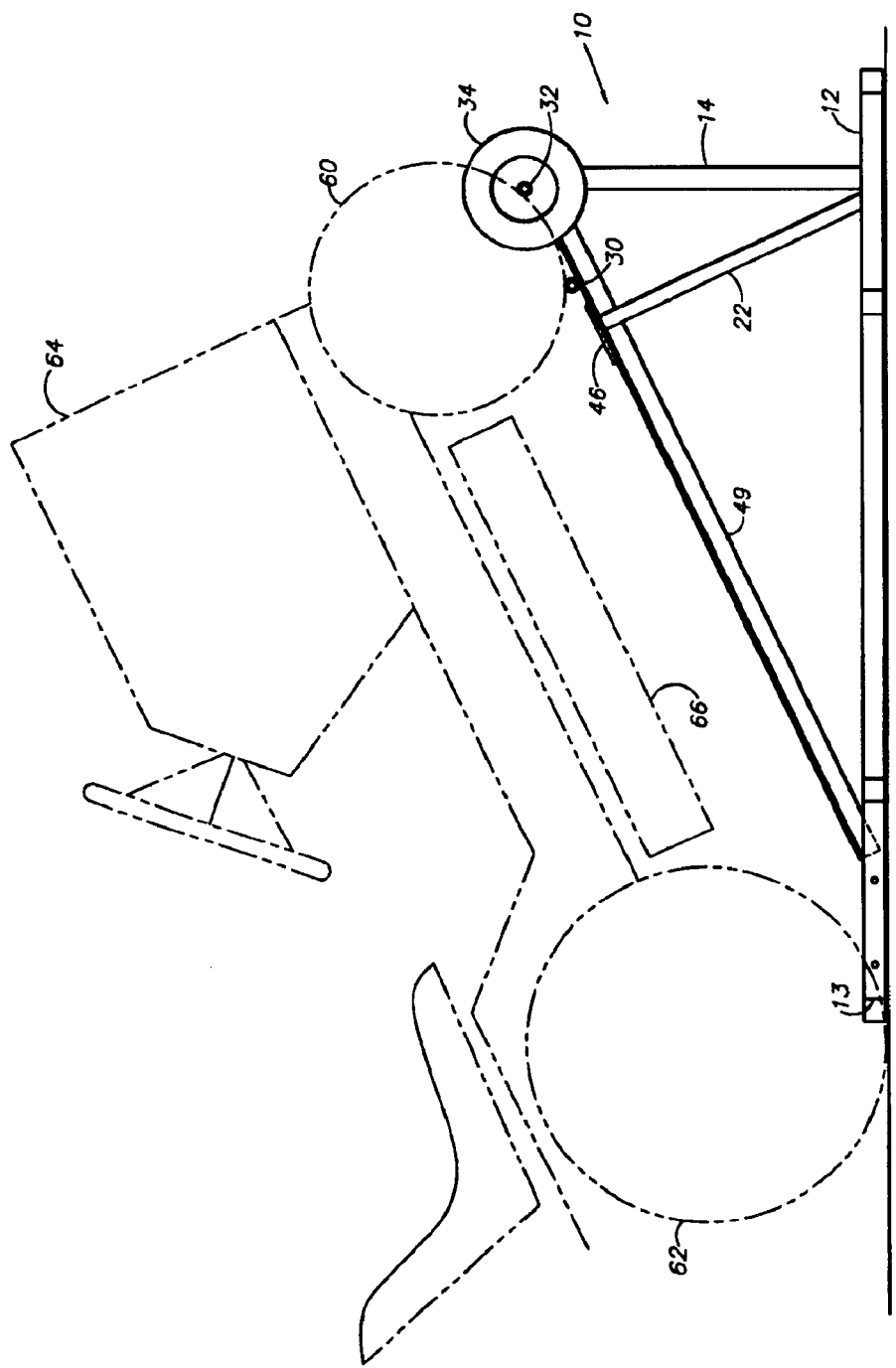
FIG. 3 is a side elevation view of the multi-use lawn cart of FIG. 2 shown in use as an equipment service ramp.

When ramp frame 40 is in place and engaged with the ramp support bar 24, the ramp frame 40 presents an inclined plane relative to frame 12. Ramps 44 are spaced to allow alignment with the front 60 or rear 62 tires of a lawn tractor 64, for example (See FIG. 3). The lawn tractor 64 may be driven up ramps 44 until the front tires 60 roll over stop bars 30 and come to rest against axles 32 and the rear tires 64 rest on top of the end 13 of frame 12. In this position, the front end of the lawn tractor 64 is supported by legs 14 and ramp support members 22, while the rear end wheels 62 anchor the end 13 of frame 12.

Figure 4:
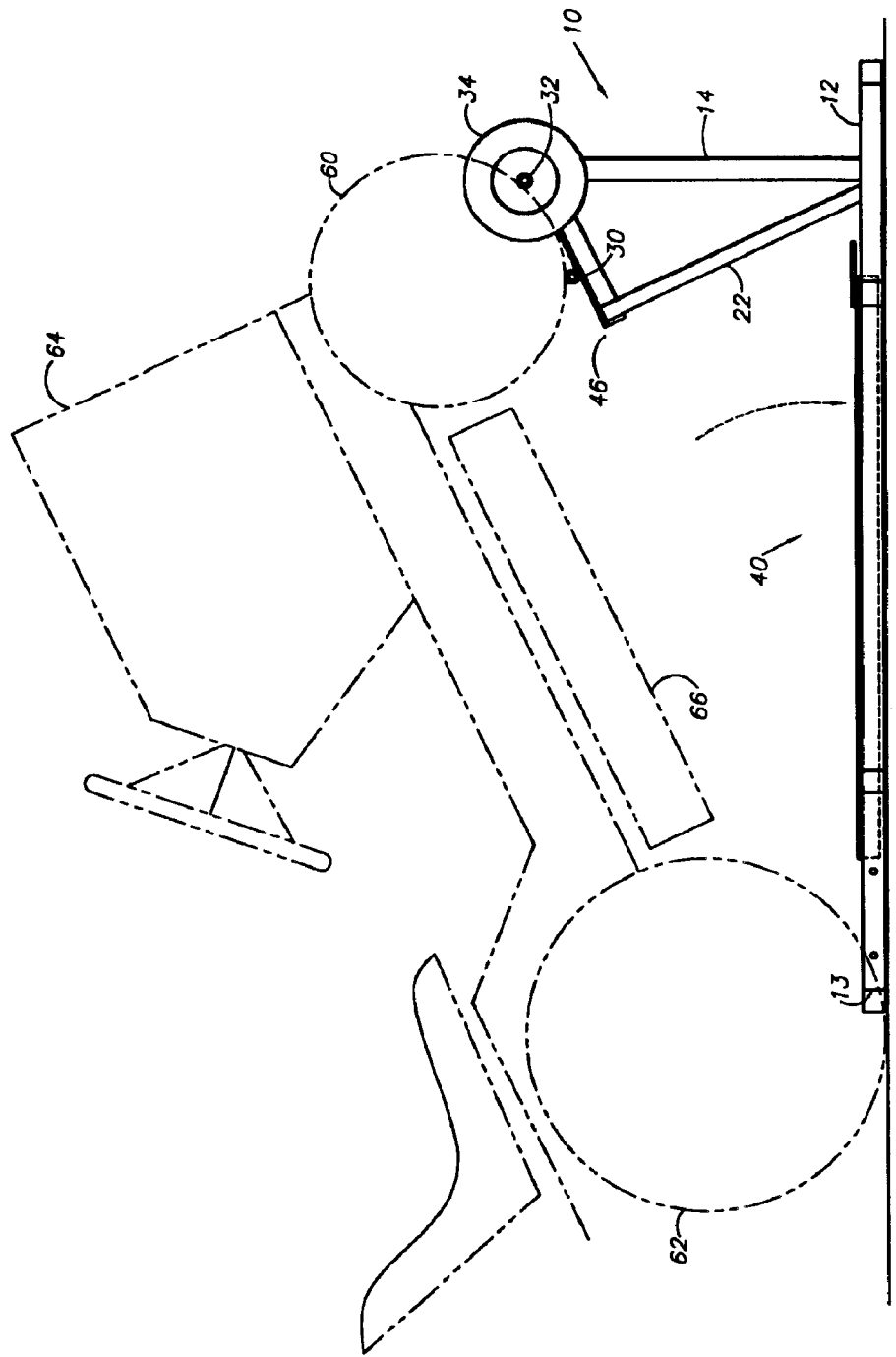
FIG. 4 is a multi-use lawn cart of FIG. 3 with the equipment ramps removed to provide access to the underside of the lawn equipment.

Referring to FIG. 4, while lawn tractor 64 is in the incline position as shown, removable ramp frame 40 may be disengaged from wheel support frame 18 leaving lawn tractor 64 in an inclined position and allow easy access to the underside of the lawn tractor 64 such as the mowing deck 66. Multi-use lawn cart 10 provides a stable work stand to maintain lawn tractor 64. In this position, the user has easy access to the blade of the lawn tractor 64 for sharpening or to clean under the mowing deck 66, for example. When maintenance is completed, the ramp frame 40 may be put back in place and the lawn tractor 64 backed down the ramp for use.

In the preferred embodiment, the frame 12, legs 14 and cross members 13, 16 and 20 may be made of one and one-half inch square steel tubing or other suitable structural material. The inner 26 and outer rails 28 of the wheel support frames may be made using one and one-half inch angle iron. The ramp support member 22 may be made of one inch round steel tubing, for example. All components are welded together to provide a rigid structure. Fasteners may also be used to assemble the various components of multi-use lawn cart 10.

The ramp assembly 40 is constructed of one and one-half inch square steel tubing and the front frame member 43 may be constructed of one-inch round steel stock. Brackets 46 may be constructed of one-fourth inch plate steel. Center rail 50 may be positioned and aligned in an inverted "V" and welded in place between rear frame member 42 and bracket 46.

All steel parts and welds are properly treated with a rust resistant paint or other coating.

III. Lawn Cart and Trailer

Figure 5:
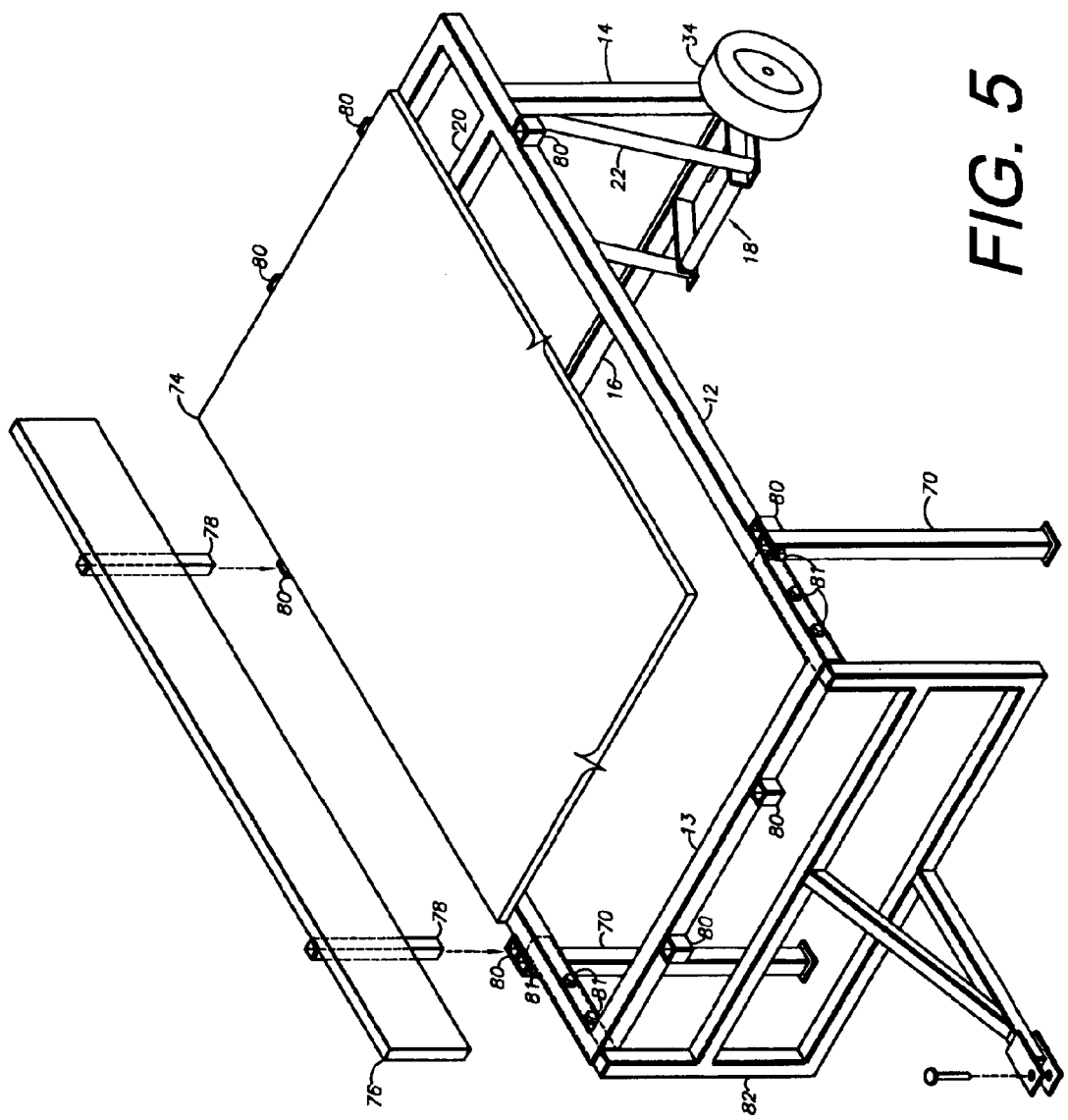
FIG. 5 is an upper perspective view of the multi-use lawn cart configured for use as a lawn cart/trailer.
Figure 6:
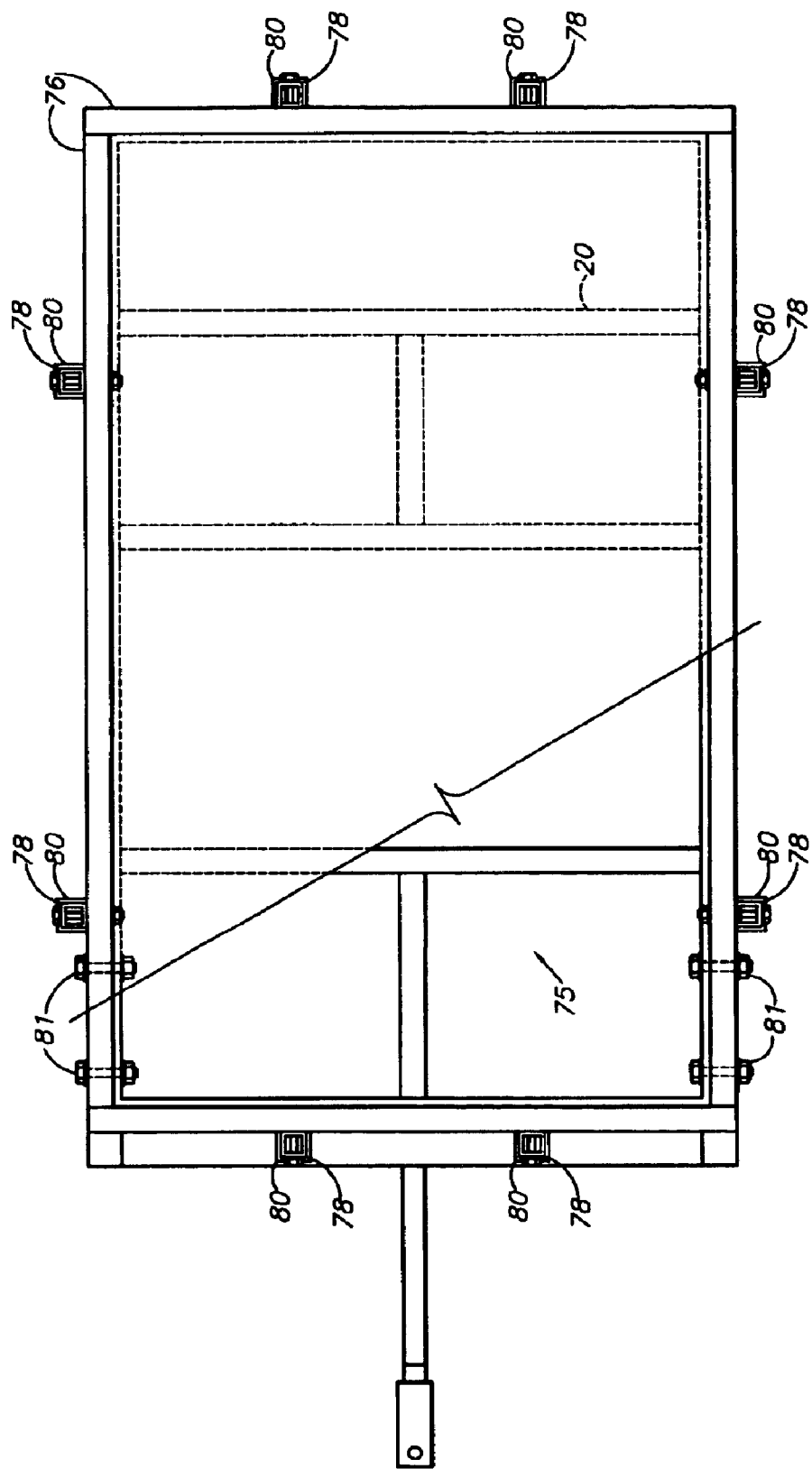
FIG. 6 is a top plan view of FIG. 5.

Referring to FIGS. 5 and 6, multi-use lawn cart 10 is shown in a lawn cart, work table configuration. The frame 12 is inverted (compared to FIGS. 1–4) to rest on wheels 34 and supported by removable front legs 70 which are secured at their upper ends by mechanical fasteners 81 (e.g., bolts, nuts and washers) extending through the front leg upper ends and through side brackets 80. Front legs 70 can be one and one-fourth inch square steel tubing. A plywood or other top 74 may be placed over frame 12 to provide a work surface. Optional sides 76 including side posts 78 adapted to fit within side brackets 80 may also be used to create a lawn cart suitable for hauling lawn debris or for other purposes. The other optional side and the front and rear sides are not shown.

Side brackets 80 may be welded to frame 12. Work surface 74 may also include a support frame 75 constructed of two-by-four lumber or other suitable material to add strength to the top 74.

A trailer hitch frame 82 may be inserted into the side members of frame 12 and secured therein by mechanical fasteners 81 (e.g., bolts, nuts and washers) to allow the multi-use lawn cart 10 to be fastened to a lawn tractor (not shown). When attached to a lawn tractor, legs 70 may be removed and placed in the cart 10.

With the trailer hitch frame 82 removed, a user may grasp the cross member 13 and pivot the cart 10 on wheels 34 to easily move the cart 10 for use as a manual lawn cart.

IV. Receiver Hitch Utility Ramp

Figure 7:
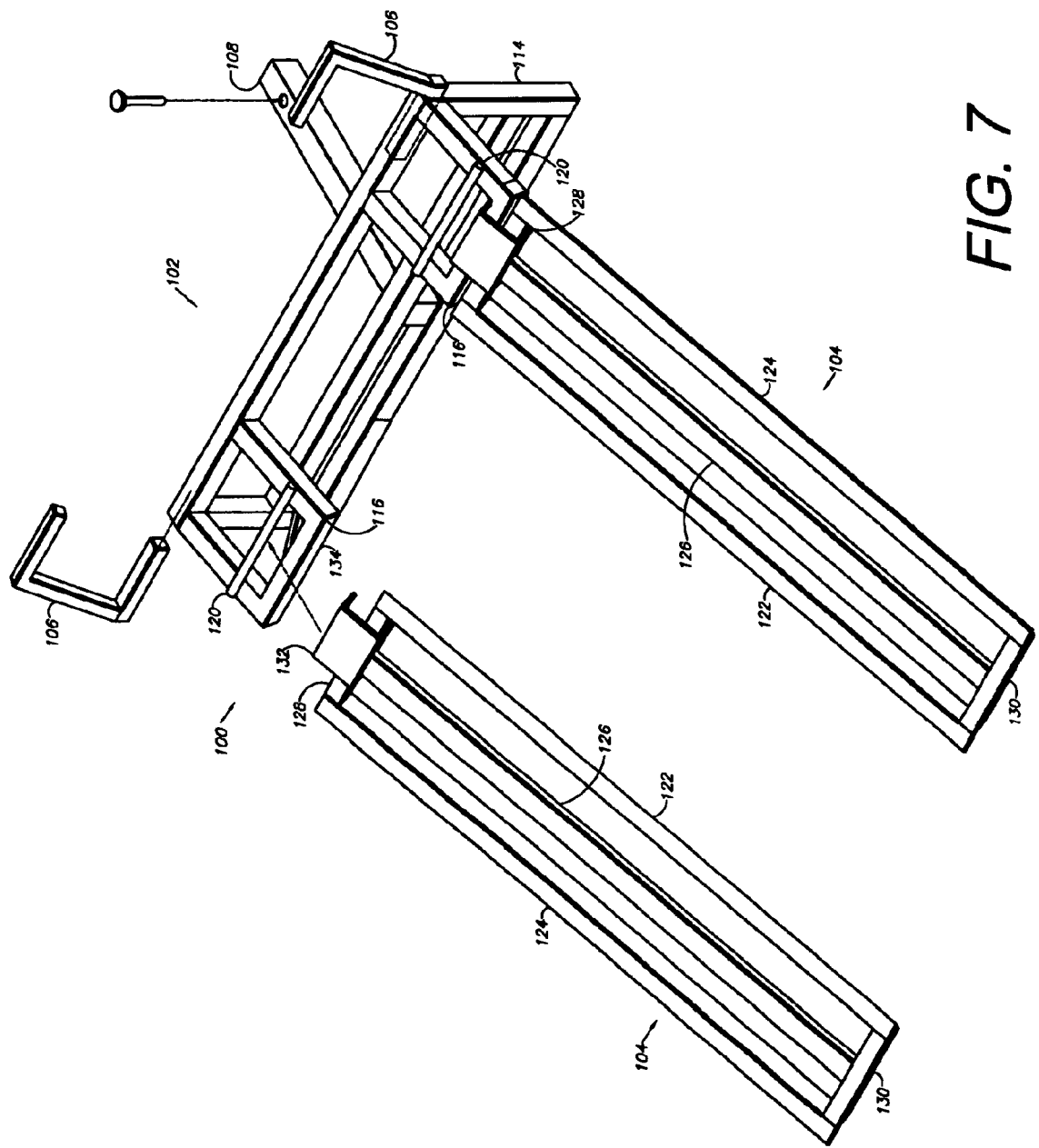
FIG. 7 is an upper perspective view of a utility ramp configured for use with a trailer hitch and supported by a vehicle.
Figure 8:
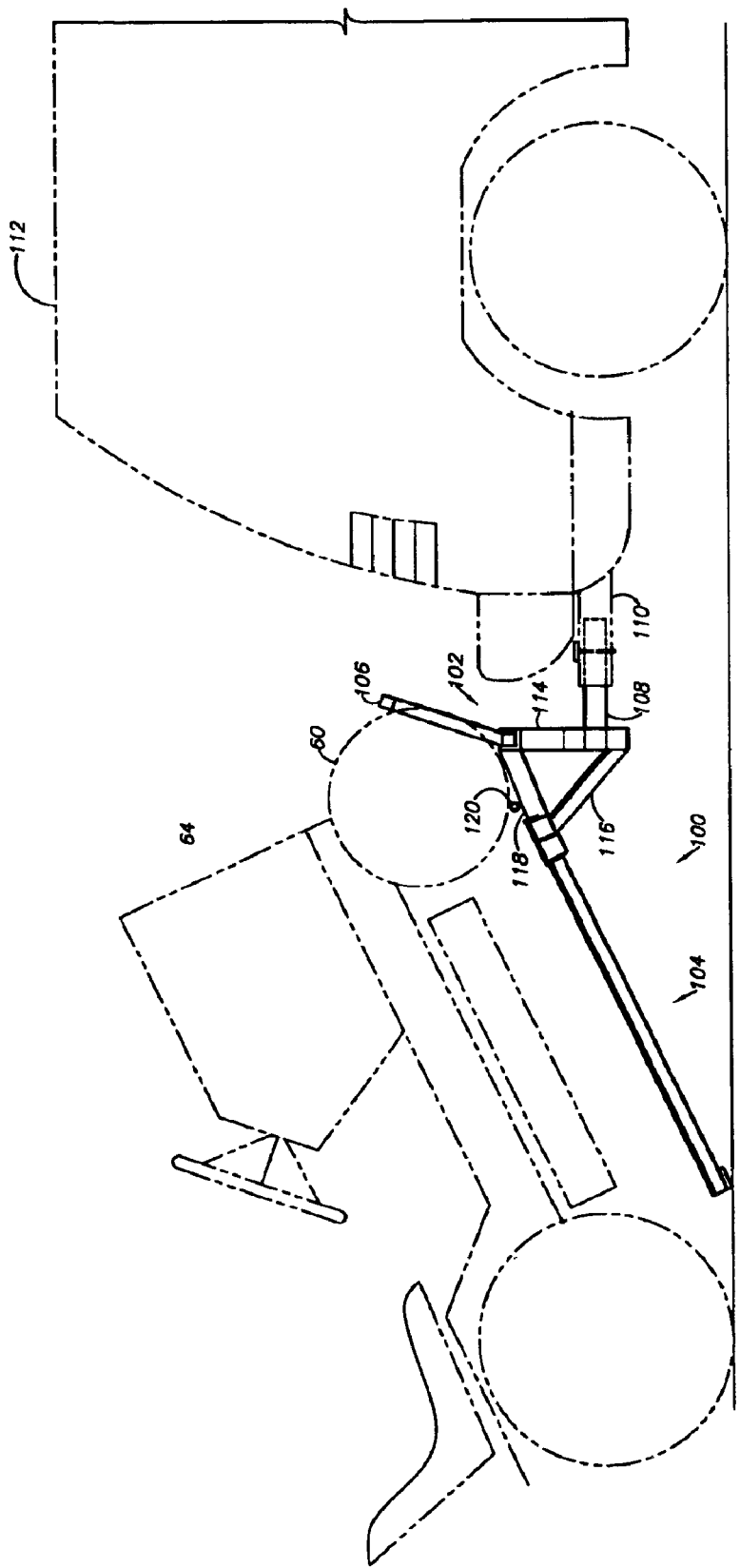
FIG. 8 is a side elevation view of the utility ramp of FIG. 7 shown attached to a vehicle.
Figure 9:
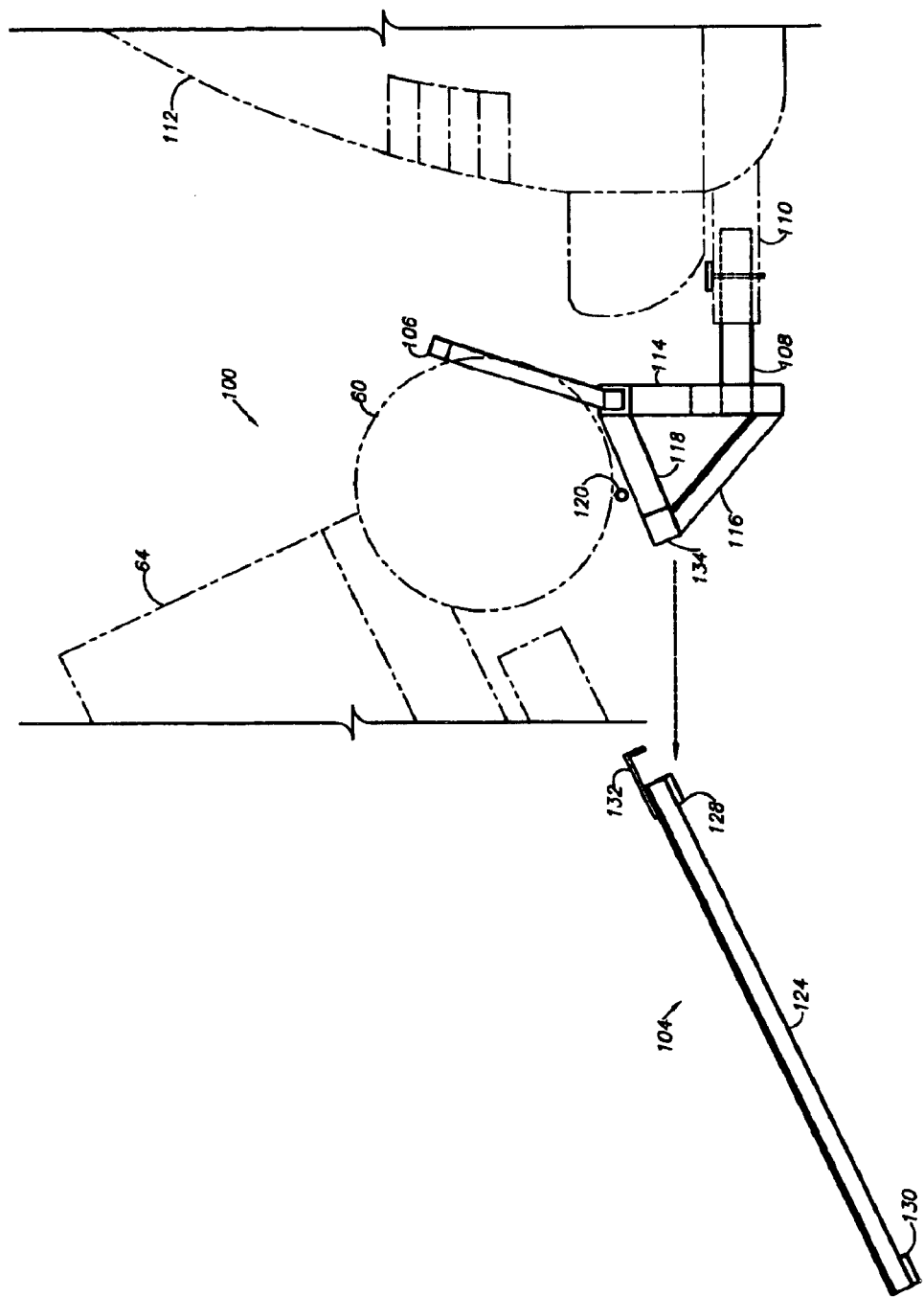
FIG. 9 is the utility ramp of FIG. 8 with the equipment ramps removed to provide access to the underside of the lawn equipment.

Referring to FIGS. 7–9, a trailer hitch mounted utility ramp 100 is shown. Hitch mounted utility ramp 100 includes a hitch frame 102, a pair of removable ramps 104 and a pair of forward wheel stops 106.

Hitch frame 102 includes a tongue 108 for engaging the hitch 110 of a vehicle 112. Tongue 108 is secured to a generally rectangularly-shaped frame 114, wheel support frames 116, braces 118 and wheel stops 120. Hitch frame members 108, 114, 116 and 118 are preferably constructed of square steel tubing.

Ramps 104 includes inner 122, outer 124 and center 126 rails secured to front 128 and rear 130 frame members. A C-shaped bracket 132 is sized to fit over the rear frame member 134 of wheel support frame 116 and generally align ramps 104 with wheel support frames 116.

With the ramps 104 in place engaging wheel support frame 116, a lawn tractor 64 may be driven up the ramps 104 over wheel stops 120 until the front wheels 60 encounter forward wheel stops 106. In this position, the front wheels 60 of tractor 64 are resting between forward wheel stops 106 and wheel stops 120. Wheel stops 120 prevent the tractor from inadvertently rolling down the ramp 104 or off of wheel support frames 118.

With tractor 64 in the inclined position and front wheels 60 engaging the wheel stops 106 and 120, the ramps 104 may be disengaged from wheel support frames 118 to allow easy access to the underside of tractor 64 while providing a stable platform. The user may perform maintenance and/or repair to the underside components of lawn tractor 64. When the work on tractor 64 is completed, ramps 104 may be replaced and the lawn tractor 64 backed off the ramps 104.

It will be appreciated that various other configurations and embodiments may fall within the scope of the present invention. While certain forms of the present invention have been illustrated and described herein, it is not to be limited to the specific forms or arrangement of parts described and shown.

Having thus described the invention, what is claimed as new and desired to be secured by Letters Patent is:

1. A combination cart and ramp device, which comprises:

a main frame with a front, a back and opposite sides;

a wheel support frame with a proximate end mounted on said main frame in proximity to the front end thereof and a distal end, said wheel support frame extending generally perpendicularly from said main frame;

a wheel mounted on said wheel support frame distal end;

a ramp frame with a front end, a back end, opposite sides and a pair of ramps extending between said ends, each said ramp being located adjacent to a respective ramp frame side;

said device having a cart configuration with said wheel support frame depending downwardly from said main frame;

said device having a ramp configuration with said wheel support frame extending upwardly from said main frame; and said ramp frame being adapted for attachment at its front end to said wheel support frame distal end and at its back end to said main frame in proximity to said main frame back end whereby said ramp frame slopes between said main frame and said wheel support frame.

2. The device according to claim 1, which includes:
a pair of said wheel support frames each located adjacent to a respective side of said main frame;
a pair of said wheels each mounted on a respective wheel support frame;
each said wheel support frame including a transverse ramp support bar; and
said ramp frame including a pair of hook-shaped brackets located at its front end and each adapted for selectively engaging a respective ramp support bar with said device in its ramp configuration.

3. The device according to claim 2, which includes:
a pair of transverse wheel stop bars each mounted on a respective wheel support frame and adapted for retaining a respective wheel of a vehicle or piece of equipment elevated on said device; and
said ramp frame being removable from said main frame and from said wheel support frames with said device in its ramp configuration.

4. The device according to claim 2 wherein:
each said ramp includes an inner rail, an outer rail and a center rail member located between said inner and outer rails, said rails and said center rail member extending in generally parallel, spaced relation between said ramp frame front and back ends; and
each said bracket being mounted on a respective center rail member.

5. The device according to claim 4 wherein each wheel support frame includes inner and outer rails, which align with respective ramp inner and outer rails with said device in its ramp configuration.

6. The device according to claim 5, which includes:
each said wheel support frame including a leg mounted on said main frame;
a wheel support frame cross member extending between said wheel support frames and mounted on said legs;
said wheel support frame rails being mounted on said cross member;
said main frame including a cross member extending transversely between the main frame sides; and
each said wheel support frame including a first ramp support member extending from a respective side of said main frame to said wheel support frame outer rail and a second ramp support member extending from said main frame cross member to said wheel support frame inner rail.

7. The device according to claim 5 wherein:
said ramp frame inner and outer rail members comprise angle-section members; and
said ramp frame has a storage position lowered at least partly into said main frame and generally coplanar therewith.

8. The device according to claim 2, which includes:
a pair of front legs each mounted on a respective side of said main frame and depending downwardly there from with said device in its cart configuration.

9. The device according to claim 2, which includes:
a trailer hitch frame mounted on the back of said main frame with said device in its cart configuration and including a longitudinally-extending tongue with a distal end and a trailer hitch mounted said tongue distal end and adapted for connection to a vehicle hitch.

10. The device according to claim 9, which includes:
said main frame including a pair of square, tubular side members each located adjacent to a respective main frame side; and
said trailer hitch frame including a pair of extensions each adapted to be telescopically received in a respective main frame side member.

11. The device according to claim 9, which includes:
a pair of tubular brackets mounted on each of said sides and said front and back of said main frame;
a pair of side barriers each including a side panel and a pair of side posts, said side posts being telescopically received in respective said brackets for mounting said side barriers on said main frame sides; and
a pair of end barriers each including an end panel and a pair of end posts, said end posts being telescopically received in respective said brackets for mounting said end barriers on said main frame ends.

12. The device according to claim 1 wherein said main frame comprises square tubular members.

13. The device according to claim 2 wherein said ramp frame includes:
a tubular front ramp frame member with a circular cross-sectional configuration at said ramp frame front end;
a semi-circular handle mounted on said front frame member and projecting forwardly therefrom; and
an angle-section back ramp frame member located at said ramp frame back end.

14. The device according to claim 6, which includes a pair of axles mounted on said wheel support frame cross member and each mounting a respective said wheel.

15. The device according to claim 11 wherein said legs are selectively mounted on respective brackets mounted on said main frame side members with said device in its cart configuration and each said leg includes a lower end with a square-shaped metal plate foot.

16. A combination ramp and cart device, which comprises:
a main frame with opposite ends, opposite sides, square tubular main frame members located at said ends and sides respectively, a cross member extending between said side members in proximity to one of said end members;
a pair of tubular brackets mounted on each said main frame member and including a bracket receiver aligned generally transversely to said frame member;
a pair of wheel support frames each including a leg mounted on a respective frame side member and extending generally perpendicularly there from;
a pair of wheels each mounted on a respective wheel support frame;
each said wheel support frame including a transverse ramp support bar;
each wheel support frame including inner and outer rails;
a wheel support frame cross member extending between said wheel support frames and mounted on said legs;
said wheel support frame rails being mounted on said cross member;
said main frame including a main frame cross member extending transversely between the main frame sides;
each said wheel support frame including a first ramp support member extending from a respective side of said main frame to said wheel support frame outer rail and a second ramp support member extending from said main frame cross member to said wheel support frame inner rail;
a pair of transverse wheel stop bars each mounted on a respective wheel support frame and adapted for retaining a respective wheel of a vehicle or piece of equipment elevated on said device;

said device having a cart configuration with said wheel support frame depending downwardly from said main frame;

said device having a ramp configuration with said wheel support frame extending upwardly from said main frame;

a ramp frame with a front end, a back end, opposite sides and a pair of ramps extending between said ramp frame ends, each said ramp being located adjacent to a respective ramp frame side;

said ramp frame being removable from said main frame and from said wheel support frames with said device in its ramp configuration;

each said ramp including an inner rail, an outer rail and a center rail member located between said inner and outer rails, said rails and said center rail member extending in generally parallel, spaced relation between said ramp frame front and back ends;

said ramp frame including a pair of hook-shaped brackets located at its front end and each adapted for selectively engaging a respective ramp support bar with said device in its ramp configuration;

each said bracket being mounted on a respective center rail member;

said ramp frame being adapted for attachment at its front end to said wheel support frame distal end and at its back end to said main frame in proximity to said main frame back end whereby said ramp slopes between said main frame and said wheel support frame said ramp frame outer rail members comprising angle iron;

said ramp frame having a storage position lowered at least partly into said main frame and generally coplanar therewith;

a pair of front legs each mounted on a respective side of said main frame and depending downwardly there from with said device in its cart configuration;

a trailer hitch frame mounted on the back of said main frame with said device in its cart configuration and including a longitudinally-extending tongue with a distal end and a trailer hitch mounted said tongue distal end and adapted for connection to a vehicle hitch;

said main frame including a pair of square, tubular side members each located at a respective main frame side;

said trailer hitch frame including a pair of extensions each adapted to be telescopically received in a respective main frame side member;

a pair of tubular brackets mounted on each of said sides and said front and back; and a pair of side barriers each including a side panel and a pair of side posts, said side posts being telescopically received in respective said brackets for mounting said side barriers on said main frame; and a pair of end barriers each including an end panel and a pair of end posts, said end posts being telescopically received in respective said brackets for mounting said end barriers on said main frame.

\* \* \* \* \*